(12) United States Patent
Branson et al.

(10) Patent No.: US 9,262,223 B2
(45) Date of Patent: *Feb. 16, 2016

(54) LAZY INITIALIZATION OF OPERATOR GRAPH IN A STREAM COMPUTING APPLICATION

(71) Applicant: International Business Machines Corporation, Armonk, NY (US)

(72) Inventors: Michael J. Branson, Rochester, MN (US); Michael P. Koranda, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/170,575

(22) Filed: Feb. 1, 2014

(65) Prior Publication Data
US 2015/0154052 A1 Jun. 4, 2015

Related U.S. Application Data

(63) Continuation of application No. 14/094,944, filed on Dec. 3, 2013.

(51) Int. Cl.
*G06F 9/46* (2006.01)
*G06F 15/173* (2006.01)
(Continued)

(52) U.S. Cl.
CPC .............. *G06F 9/5011* (2013.01); *G06F 9/48* (2013.01); *G06F 9/485* (2013.01); *G06F 9/4806* (2013.01); *G06F 9/4843* (2013.01); *G06F 9/4868* (2013.01); *G06F 9/4881* (2013.01); *G06F 9/4887* (2013.01); *G06F 9/50* (2013.01); *G06F 9/5005* (2013.01); *G06F 9/505* (2013.01); *G06F 9/5016* (2013.01); *G06F 9/5027* (2013.01); *G06F 9/5038* (2013.01); *G06F 9/5061* (2013.01); *G06F 9/5066* (2013.01); *G06F 9/5083* (2013.01); *G06F 9/5088* (2013.01)

(58) Field of Classification Search
None
See application file for complete search history.

(56) References Cited

U.S. PATENT DOCUMENTS

| | | | | |
|---|---|---|---|---|
| 6,243,755 | B1 * | 6/2001 | Takagi et al. | 709/229 |
| 2008/0005392 | A1 * | 1/2008 | Amini et al. | 710/29 |

(Continued)

OTHER PUBLICATIONS

"Lazy initialization", Wikipedia, Mar. 12, 2013, pp. 1-10, retrieved Jun. 28, 2013, <http://en.wikipedia.org/wiki/Lazy_initialization>.

(Continued)

*Primary Examiner* — Charles Swift
(74) *Attorney, Agent, or Firm* — Patterson & Sheridan, LLP (57) ABSTRACT

System, method, and computer program product to perform an operation, comprising receiving job information for a stream computing application, the job information comprising a plurality of processing elements configured to process streaming data tuples according to an execution path defined by a operator graph, deploying a first set of processing elements of the plurality of processing elements to one or more compute nodes, initializing a subset of the first set of processing elements, executing the stream computing application on the first set of processing elements, and, responsive to receiving a predefined number of data tuples to be processed by an additional processing element of the plurality of processing elements when executing the stream computing application, deploying the additional processing element to the one or more compute nodes, and initializing the additional processing element.

9 Claims, 7 Drawing Sheets

(51) Int. Cl.
*G06F 9/50* (2006.01)
*G06F 9/48* (2006.01)

(56) References Cited

U.S. PATENT DOCUMENTS

| | | | | |
|---|---|---|---|---|
| 2009/0300615 | A1* | 12/2009 | Andrade et al. | 718/100 |
| 2010/0106946 | A1 | 4/2010 | Imaki et al. | |
| 2010/0293301 | A1* | 11/2010 | Amini et al. | 710/12 |
| 2010/0293532 | A1* | 11/2010 | Andrade et al. | 717/140 |
| 2010/0325621 | A1* | 12/2010 | Andrade et al. | 717/156 |
| 2012/0110042 | A1* | 5/2012 | Barsness et al. | 707/825 |
| 2012/0137178 | A1* | 5/2012 | Barsness et al. | 714/35 |
| 2012/0179809 | A1* | 7/2012 | Barsness et al. | 709/224 |
| 2012/0218268 | A1 | 8/2012 | Accola et al. | |
| 2013/0166618 | A1* | 6/2013 | Branson et al. | 709/201 |
| 2013/0290966 | A1* | 10/2013 | Branson et al. | 718/102 |

OTHER PUBLICATIONS

U.S. Appl. No. 14/094,944, entitled Lazy Initialization of Operator Graph in a Stream Computing Application, filed Dec. 3, 2013.

* cited by examiner

LAZY INITIALIZATION OF OPERATOR GRAPH IN A STREAM COMPUTING APPLICATION

This application is a continuation of co-pending U.S. patent application Ser. No. 14/094,944, filed Dec. 3, 2013. The aforementioned related patent application is herein incorporated by reference in its entirety.

BACKGROUND

The present disclosure relates to computer software, and more specifically, to computer software to provide lazy initialization of an operator graph in a stream computing application.

Stream computing applications may consist of streams of data flowing through elements of processing that form an operator (or flow) graph. Operator graphs may be instantiated when a job (or application) is submitted. As part of the instantiation, initialization of the operator graph may also occur. The instantiation of a complete operator graph allocates all resources associated with the operator graph, even if parts of the operator graph are ultimately never used by the stream computing application. For example, some parts of a operator graph only receive tuples in exceptional cases, or when a certain input stream is present. Therefore, parts of a operator graph are typically instantiated and wait for data that never arrives, or does not arrive for hours or days.

Stream computing applications may process real-time data and often operate under conditions of data overload. Furthermore, stream computing applications may run continuously, i.e., they are submitted and process real-time data for months or even years without being restarted. Therefore it is beneficial to conserve resources when possible in order to allow the stream computing application to process the real-time data it is ingesting.

SUMMARY

System, method, and computer program product to perform an operation, comprising receiving job information for a stream computing application, the job information comprising a plurality of processing elements configured to process streaming data tuples according to an execution path defined by a operator graph, deploying a first set of processing elements of the plurality of processing elements to one or more compute nodes, initializing a subset of the first set of processing elements, executing the stream computing application on the first set of processing elements, and, responsive to receiving a predefined number of data tuples to be processed by an additional processing element of the plurality of processing elements when executing the stream computing application, deploying the additional processing element to the one or more compute nodes, and initializing the additional processing element.

DETAILED DESCRIPTION

Embodiments disclosed herein implement lazy instantiation, lazy initialization, and dynamic instantiation in order to efficiently manage stream computing application resources. The lazy instantiation, lazy initialization, and dynamic instantiation may be applied to a portion of the operator graph (also referred to as a flow graph) generated for a stream computing application. Generally, embodiments disclosed herein introduce the ability to specify if a subgraph (a subset of an operator graph) should have its instantiation and/or its initialization performed at startup, or only upon detection of one or more conditions, including but not limited to detecting the arrival of a threshold number of tuples at the subgraph. Instantiation may generally refer to creating one or more objects (such as processing elements and connections between processing elements) in the stream computing application. Initialization may refer to connecting to external systems, loading data from external systems into the processing element, allocating resources used by the processing element, and the like.

Generally, lazy instantiation refers to deferring instantiation of a subset of the operator graph until a condition is met, such as the arrival of a threshold number of tuples at the processing elements at the edge of the subset of the operator graph. Lazy initialization generally refers to the notion of deferring the initialization of instantiated portions of the operator graph until a condition is met, such as the arrival of a threshold number of tuples at the processing elements at the edge of the subset of the operator graph. In addition, lazy instantiation requires deferring initialization of uninstantiated subgraphs until the subgraphs are instantiated. Dynamic instantiation may generally refer to removing a subgraph of the operator graph upon detection of a certain condition, such as not receiving a threshold number of tuples in a predefined period of time. The dynamically uninstantiated subgraph may later be instantiated when data tuples arrive to trigger lazy instantiation.

If no specification is made for a portion of the graph, this portion may run as normal, with resources being instantiated and initialized prior to the arrival of the first data tuples, thereby not introducing any additional latency for the first data tuples. If lazy initialization is specified for a subgraph, the subgraph may be instantiated, but the initialization may not occur until a threshold number of tuples is detected on an input port. If lazy instantiation is specified for a subgraph, both the instantiation and initialization may not occur until a threshold number of tuples is detected on an input port. If dynamic instantiation is specified for a subgraph, the subgraph would be added or removed, depending on the arrival of tuples for the specified period (or other existence condition). Tuples may be detected on input ports of instantiated but uninitialized processing elements. For uninstantiated subgraphs, data tuples may be detected by processing elements that have been instantiated on the edge of the uninstantiated subgraph, or by "stubs" (instantiated placeholder processing elements) that represent the subgraph and trigger instantiation upon receipt of a tuple. Additionally, an output port of an instantiated processing element on the edge of the uninstantiated graph may detect the data tuples. For example, if the output port is connected (or will be connected) to a part of the graph that is not yet instantiated or initialization, if the output port receives data tuples destined for the uninstantiated or unitialized part of the graph, it may trigger the instantiation or initialization of these parts of the graph.

FIGS. 1A-1D illustrate a computing infrastructure configured to execute a stream computing application, according to embodiments disclosed herein. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more operators in one or more source processing elements (PEs) through to one or more operators in one or more sink PEs. This flow from source to sink is also generally referred to herein as an execution path. Generally, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates).

In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values. In one embodiment, one or more attributes of a data tuple may be encrypted. However, not all operators have the correct keys and mechanisms to decrypt data tuples. Based on the access indicators of the operators, the operator may or may not be able to decrypt data tuples.

Of course, the N-tuple received by an operator need not be the same N-tuple sent downstream. Additionally, operators could be configured to receive or emit tuples in other formats (e.g., the PEs or operators could exchange data marked up as XML documents). Based on policies and operator access indicators, operators that have decrypted data tuples may reencrypt the decrypted data tuples before sending them downstream, or may emit the decrypted data tuples. Furthermore, each operator within a PE may be configured to carry out any form of data processing functions on the received tuple, including, for example, writing to database tables or performing other database operations such as data joins, splits, reads, etc., as well as performing other data analytic functions or operations.

Figure 1A:
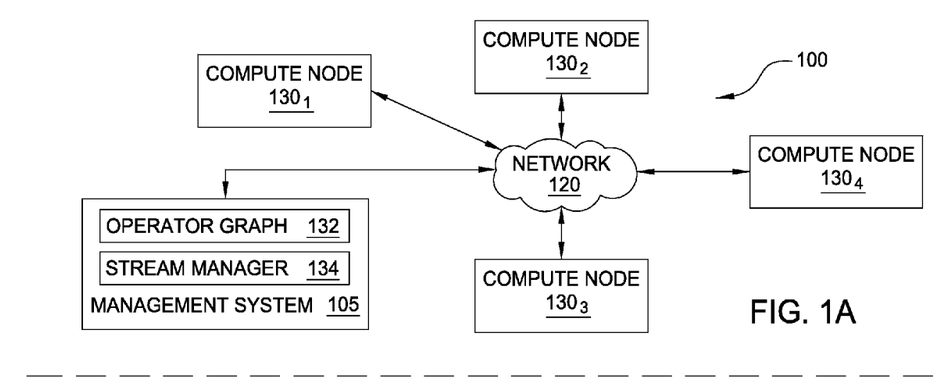
FIGS. 1A-1D illustrate a computing infrastructure configured to execute a stream computing application, according to embodiments.

The stream manager 134 may be configured to monitor a stream computing application running on the compute nodes $130_{1-4}$, as well as to change the deployment of the operator graph 132. For example, the stream manager 134 may implement lazy instantiation, lazy initialization, and dynamic instantiation of one or more processing elements (PEs) defined in the operator graph 134 on the compute nodes 130. The stream manager 134 may also move processing elements from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements and operators) running on the compute nodes $130_{1-4}$. One example of a stream computing application is IBM®'s InfoSphere® Streams (InfoSphere® is a trademark of International Business Machines Corporation, registered in many jurisdictions worldwide).

Figure 1B:
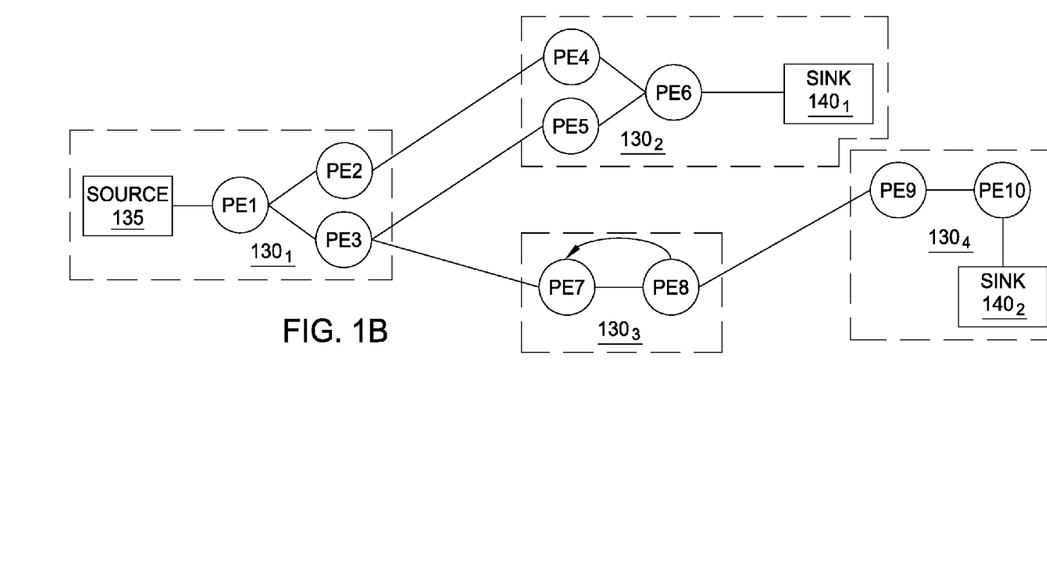

FIG. 1B illustrates an example processing element graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 $140_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node $130_3$, which itself shows data tuples flowing to operators in PE8 and looping back to operators in PE7. Data tuples emitted from operators in PE8 flow to operators in PE9 on compute node $130_4$, which in turn emits tuples to be processed by operators in sink PE10 $140_2$.

Figure 1C:
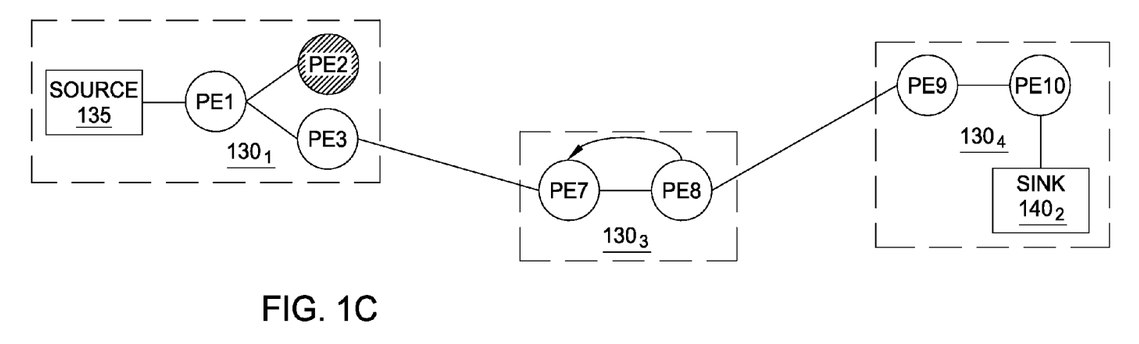
Figure 1D:
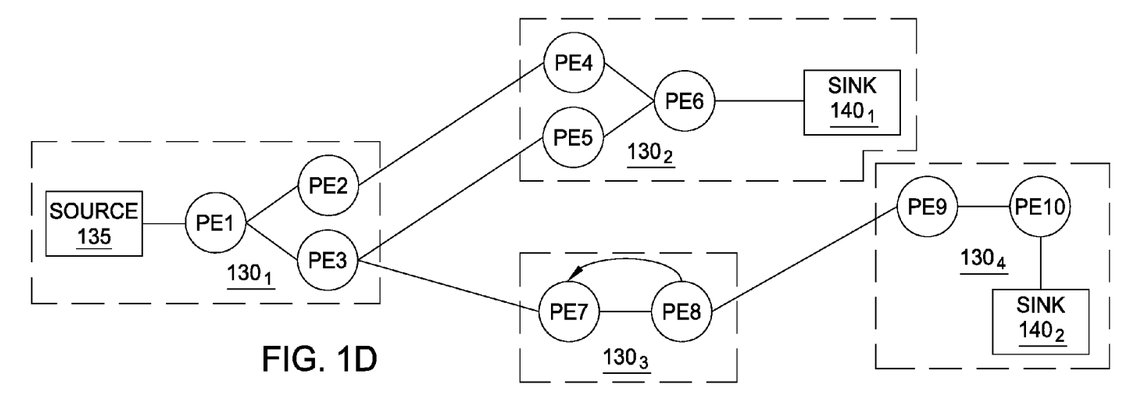

Because a processing element is a collection of fused operators, it is equally correct to describe the operator graph as data flow paths between specific operators, which may include data flow paths to different operators within the same processing element. FIGS. 1B-1D illustrate data flow paths between processing elements for the sake of clarity.

FIG. 1B represents a deployment of a stream computing application where all operators and all processing elements have been instantiated and initialized on the one or more compute nodes 130. FIG. 1C illustrates the implementation of lazy instantiation and lazy initialization of processing elements in a stream computing application, in one embodiment. As shown, the stream manager 134 instantiates and initializes PE1, PE3, PE7, PE8, PE9, and PE10. However, PE2 of compute node $130_1$ has been shaded to indicate that it has been instantiated, but not initialized. The instantiation of processing elements on compute node $130_3$ is not dependent on PE2 using lazy initialization. Furthermore, the stream manager 134 has not instantiated or initialized PE4, PE5, and PE6 of compute node $130_2$. In one embodiment, PE2, PE4, PE5, and PE6 will not process data tuples until they are fully instantiated and initialized. Because PE5 is not instantiated, the stream manager 134 has not created the connection between PE3 and PE5, even though PE3 is still processing data tuples. Although the uninstantiated and uninitialized processing elements PE4, PE5, and PE6 are depicted as being on the same compute node, lazy initialization, lazy instantiation, and dynamic instantiation apply equally to any number of processing elements on any number of compute nodes.

In some embodiments, an application developer may specify that lazy instantiation, lazy initialization, and dynamic instantiation should be applied. Additionally, the stream manager 134 may decide to implement lazy instantiation or initialization for any number of reasons. For example, the stream manager 134 may determine, based on historical trends, that PE4 receives data tuples only at a particular time of day (such as during the hours of night when a night vision camera is powered on, or during trading hours of a stock exchange). As such, the stream manager 134 may determine to instantiate the PE2 on compute node $130_1$ and instantiate and initialize the processing elements on compute node $130_2$ only when data tuples are available for processing. For example, when an input port on PE2 receives data tuples, it may send a notification to the stream manager 134 that it has received a threshold number data tuples. The threshold number may be any number, such as 1 data tuple, or 100 data tuples. In response, the stream manager 134 may initialize PE2, and instantiate and initialize PE4-PE6, such that these processing elements may process streaming data tuples.

In another embodiment, FIG. 1C can be viewed as illustrating dynamic instantiation in the stream computing application. For example, if the stream manager 134 had instantiated and initialized PE1-PE10 in FIG. 1B, FIG. 1C illustrates the embodiment where the stream manager 134 dynamically removed PE2 and PE4-PE6 from the stream computing application. The stream manager 134 may dynamically remove processing elements from the application for any reason, which may include, but is not limited to, determining that the PE2 (and PE4-PE6) have not received a threshold number of data tuples during a predefined period of time. If the processing elements have not been processing data tuples for some period of time, it may be more beneficial to overall system performance to remove the processing elements to free resources otherwise allocated to the processing elements. In such an event, the stream manager 134 may later initialize the removed processing elements once they begin receiving data tuples again.

FIG. 1D illustrates an example processing element graph representing a stream computing application after the stream manager 134 has initialized PE2 and instantiated and initialized PE4-PE6. As shown, the stream manager 134 has also initialized connections between PE2 and PE4, PE3 and PE5, PE4 and PE6, and PE5 and PE6. At this point, the stream manager 134 has fully instantiated and initialized the complete operator graph 132, meaning the stream computing application is fully operational, with all processing elements ready to process streaming data tuples, should they arrive. In embodiments where FIG. 1C illustrates dynamic instantiation, FIG. 1D illustrates the stream manager 134 re-initialization of PE2 and PE4-PE6 in the stream computing application.

Generally, the stream manager 134 may use lazy initialization, lazy instantiation, and dynamic instantiation to add or remove processing elements to or from the stream computing application at any point. As part of the initial job deployment process, the stream manager 134 may instantiate and initialize the entire operator graph 132 onto the compute nodes $130_{1-4}$. Alternatively, the stream manager 134 may instantiate and/or initialize only part of the operator graph 132, leaving a subgraph of the operator graph 132 to be instantiated and/or initialized at a later time, such as when data tuples arrive for processing at the subgraph. Furthermore, at any point after the initial deployment, the stream manager 134 may implement dynamic instantiation by dynamically adding or removing processing elements to or from the compute nodes as is necessary to improve the overall execution of the stream computing application.

Figure 2:
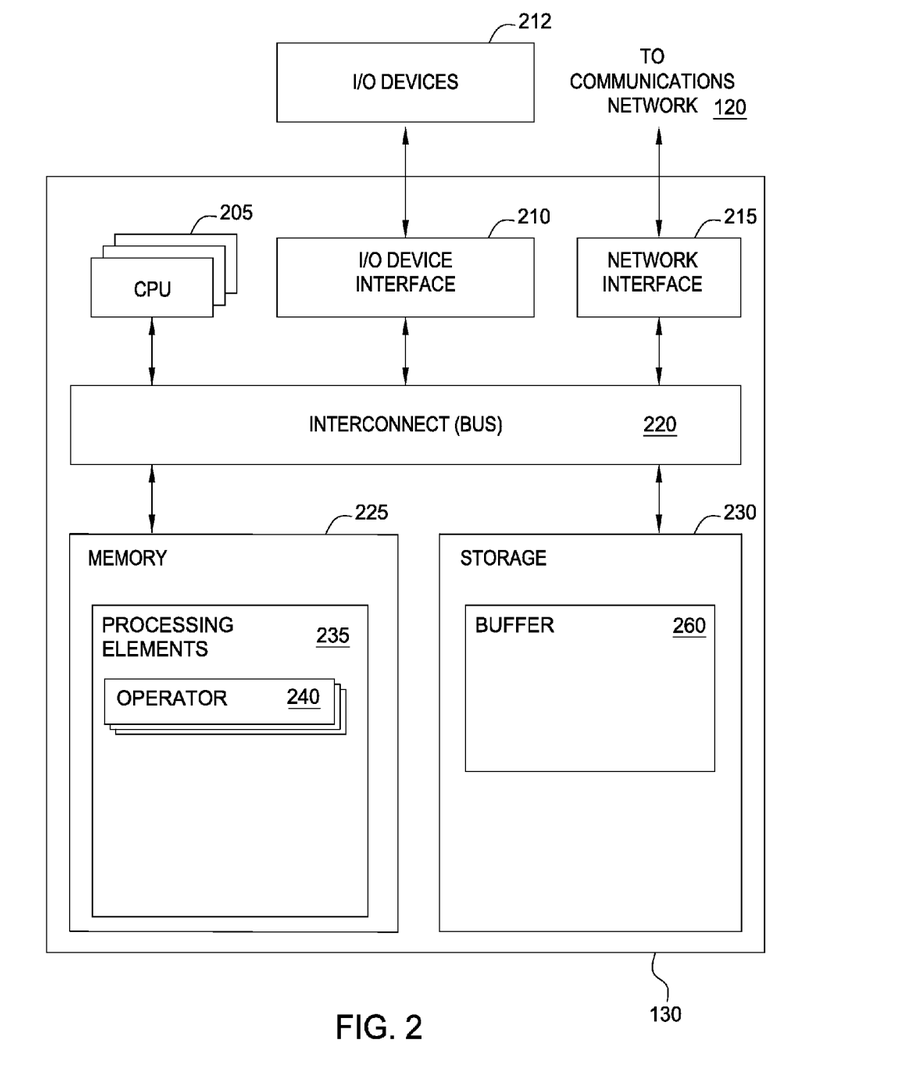
FIG. 2 is a more detailed view of the compute node of FIGS. 1A-1D, according to one embodiment.

FIG. 2 is a more detailed view of the compute node 130 of FIGS. 1A-1D, according to one embodiment disclosed herein. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may be located in the memory 225 of the compute node 130 or a combination of both. Moreover, storage 230 may include storage space that is external to the compute node 130.

Figure 3:
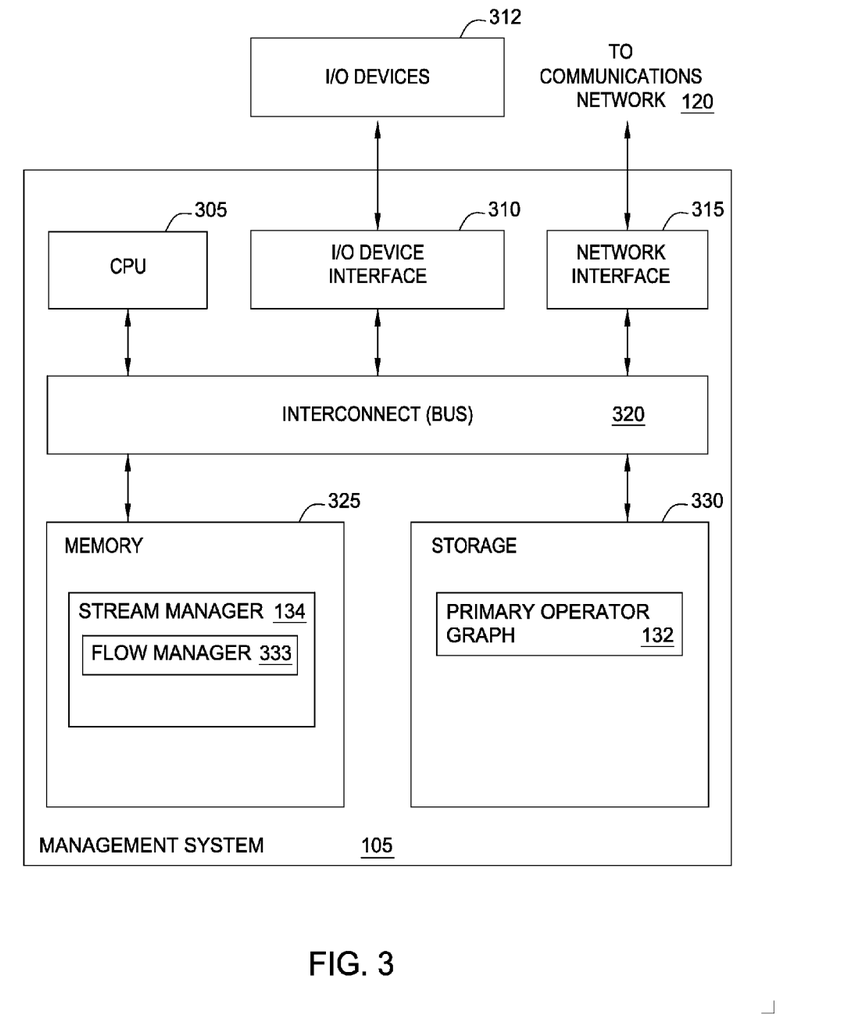
FIG. 3 is a more detailed view of the server management system of FIGS. 1A-1D, according to one embodiment disclosed herein.

FIG. 3 is a more detailed view of the server management system 105 of FIG. 1, according to one embodiment disclosed herein. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing. The stream manager 134 also includes a flow manager 333 for implementing lazy instantiation, lazy initialization, and dynamic instantiation of a subset primary operator graph 132. Generally, the flow manager 333 provides the stream manager 134 the logic necessary to "turn off" (i.e., not instantiating or initializing at deployment, or turning off during execution) portions of the primary operator graph 132 at opportune times in order to free resources, and allocate those resources to other parts of the graph.

Generally, lazy instantiation, lazy initialization, and dynamic instantiation may be implemented in a number of different ways. In one embodiment, an application developer may identify subgraphs where one or more of lazy instantiation, lazy initialization, and dynamic instantiation should be applied. The developer may specify these subgraphs in the source code of the application, or using annotations or other specifications on top of the source code, or compiled artifacts of the source code. When the developer makes these specifications, the flow manager 333 may implement lazy initialization, lazy instantiation, and dynamic instantiation as specified by the developer.

In another embodiment, at runtime, the flow manager 333 may analyze the primary operator graph 132 in order to determine one or more processing elements that are candidates for lazy instantiation, lazy initialization, and dynamic instantiation. These candidates may collectively be referred to as a subgraph of the primary operator graph 132. The flow manager 333 may identify these candidates by identifying which portions of the operator graph 132 are consistently active, and which portions are idle for long periods of time. The flow manager 333 may further identify the subgraphs based on historical utilization information. Once the subgraphs are identified, the flow manager 333 may implement one or more of lazy instantiation, lazy initialization, and dynamic instantiation, or suggest to the developer to implement one or more of these features as described above. The candidate processing elements may be identified based on any attribute indicating that the processing elements receive data tuples only when a certain set of conditions are met, or only when a certain input stream is present. The conditions include, but are not limited to, the arrival of a first single tuple, the arrival of N initial tuples, or no tuple arrivals for a predefined period of time. For example, the flow manager 333 may identify a night vision camera as an input source to a subgraph, and determine that the subgraph need not be instantiated and/or initialized until the night hours, when the input source will provide data tuples.

Once the flow manager 333 identifies the subgraph of candidate processing elements, the flow manager 333 may cause lazy instantiation, lazy initialization, and dynamic instantiation to be applied to the subgraph. For example, at job deployment, the flow manager 333 (or the stream manager 134) may instantiate but not initialize a first subgraph, and not instantiate or initialize a second subgraph. Furthermore, the flow manager 333 may cause dynamic instantiation to be triggered at initial job deployment or any point thereafter. For example, the flow manager 333 may determine at deployment that a subgraph may be a good candidate for dynamic instantiation. Alternatively, the flow manager 333 may determine that an initialized subgraph has not received a threshold number of data tuples for a predefined period of time. In response, the flow manager 333 may cause the subgraph to be removed from the streams processing application until data tuples begin arriving once again. Although depicted as a component of the stream manager 134, in at least one embodiment, the flow manager 333 may be an application separate from the stream manager 134.

Figure 4:
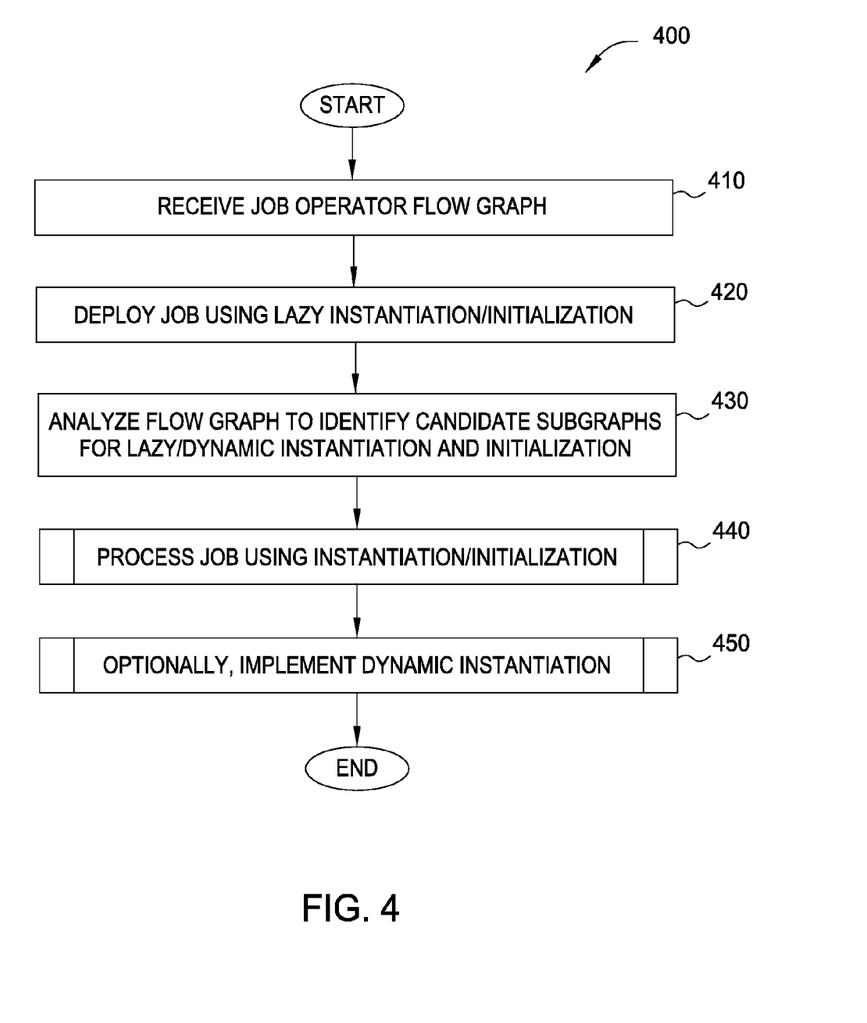
FIG. 4 illustrates a method to implement lazy initialization, lazy instantiation, and dynamic instantiation of a operator graph in a stream computing application, according to one embodiment.

FIG. 4 illustrates a method 400 to implement lazy initialization, lazy instantiation, and dynamic instantiation of an operator graph in a stream computing application, according to one embodiment. Generally, the steps of the method 400 may identify one or more subgraphs in an operator graph that are may be subject to lazy initialization, lazy instantiation, and dynamic instantiation in order to conserve resources in the stream computing application. In doing so, the stream manager 134 may allocate those resources to other parts of the stream computing application, thereby improving performance of the stream computing application. Although the flow manager 333 and the stream manager 134 may orchestrate the performance of one or more steps of the method 400, the method 400 reflects an embodiment where the stream manager 134 performs each step for the sake of clarity.

At step 410, the stream manager 134 receives a job and an operator graph for the job. The job may generally represent an instance of a stream computing application, while the operator graph represents the execution flow of a plurality of operators and processing elements of the stream computing application. At step 420 the stream manager 134 may deploy the job using lazy instantiation and lazy initialization. The stream manager 134 or the developer may define conditions for dynamic instantiation at runtime. Generally, when the stream manager 134 deploys the job at step 420, a subgraph of the overall operator graph may be subject to lazy initialization and/or lazy instantiation, as well as dynamic instantiation. If no specification is made for one or more portions of the operator graph, the stream manager 134 may deploy these portions, which may execute as normal, allocating resources and making connections prior to the first tuple arriving, and thus not introducing additional latency for the first tuple. For those subgraphs that have been made subject to lazy instantiation at runtime (for example, by a developer), the stream manager 134 will not deploy them at step 420, but at a later time when one or more conditions are met, such as the arrival of a threshold number of data tuples for processing at the subgraph. The stream manager 134 may also deploy subgraphs to the compute nodes that are defined at runtime as being subject to lazy initialization, thereby instantiating the subgraphs, but the stream manager 134 will not initialize these subgraphs until one or more conditions are met, such as the arrival of a threshold number of data tuples for processing at the subgraph.

At step 430, the stream manager 134 analyzes the operator graph to identify candidate subgraphs for at least one of lazy initialization, lazy instantiation, and dynamic instantiation. Generally, the stream manager 134 identifies the candidates by determining which subgraphs may not receive data tuples for an amount of time exceeding a predefined threshold or that may receive data tuples only under a certain set of conditions. For example, a snowfall meter may collect snowfall only during the winter months, in which case, the stream manager 134 may determine that the job, being deployed in the summer, need not instantiate the subgraph connected to the snowfall meter. The subgraph may comprise one or more processing elements, or operators on the processing elements, and may include processing elements on one or more compute nodes, or one or more virtual machines executing on a compute node. The stream manager 134 may also identify candidates subgraphs hosted on physical or virtual compute node(s). For example, the stream manager 134 may determine that all processing elements on a physical or virtual compute node may not receive data tuples for an extended period of time, and implement lazy instantiation, lazy initialization, or dynamic instantiation to all processing elements on the physical or virtual compute node.

At step 440, described in greater detail with reference to FIG. 5, the deployed job is processed by the deployed stream computing application using lazy instantiation and lazy initialization. When the stream computing application executes the job, the stream manager 134 may monitor data tuple flow in order to instantiate and/or initialize, or remove subgraphs from the operator graph. In another embodiment, operators on the edge of the subgraph, or stub operators representing the subgraph, may send an indication to the stream manager 134 that a threshold number of data tuples have arrived, and that the subgraph should be instantiated and/or initialized. At step 450, described in greater detail with reference to FIG. 6, the stream manager 134 may optionally implement dynamic instantiation. Dynamic instantiation may be specified at deployment or during processing. The stream manager 134 may implement dynamic instantiation by removing subgraphs that meet certain conditions, such as those subgraphs that have not processed a threshold number of data tuples for a given period of time.

Figure 5:
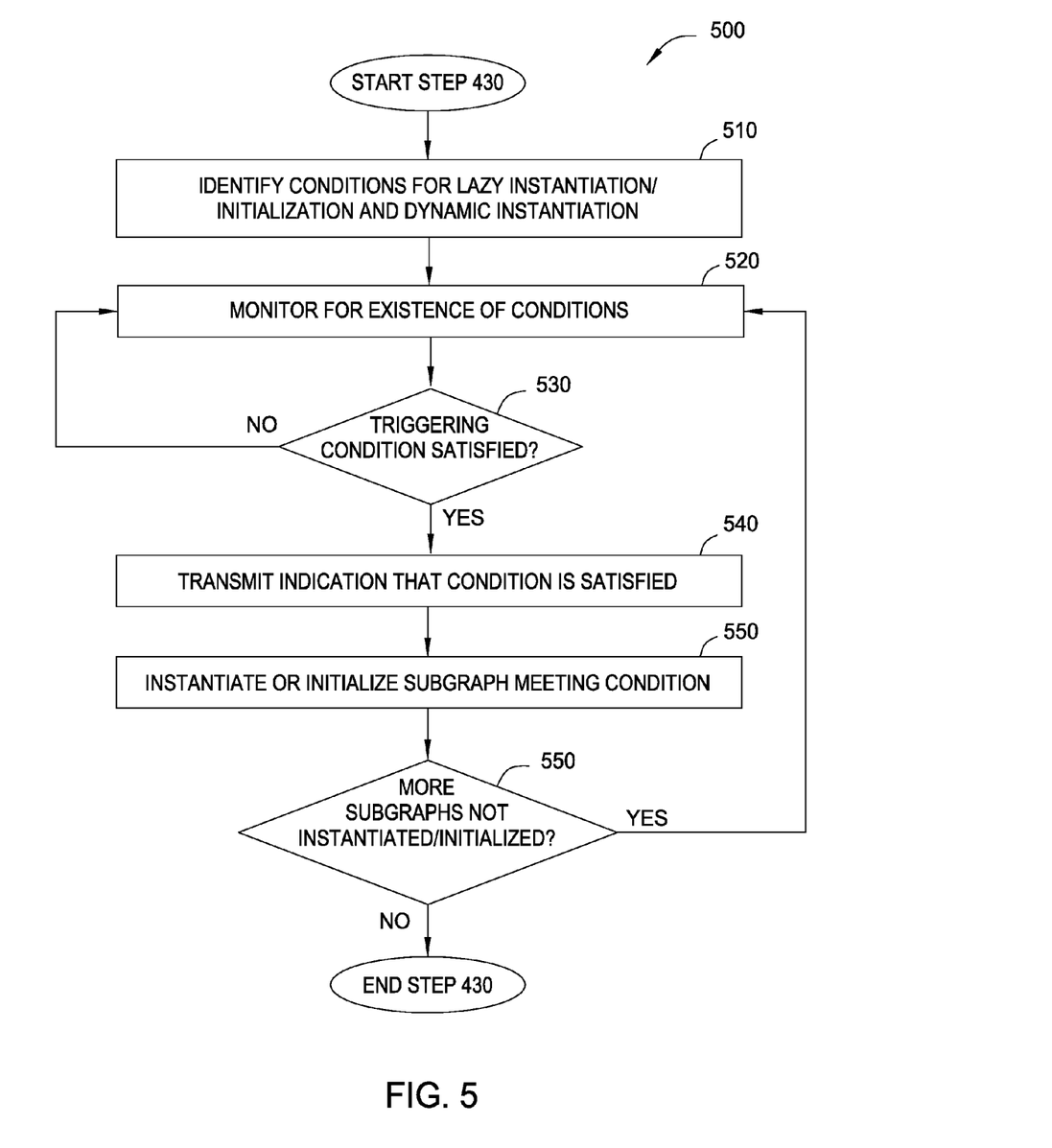
FIG. 5 illustrates a method to deploy a job using lazy instantiation and initialization, according to one embodiment.

FIG. 5 illustrates a method 500 corresponding to step 440 to deploy a job using lazy instantiation and initialization, according to one embodiment. Generally, the steps of the method 500 allow the stream manager 134 to instantiate and/or initialize processing elements onto one or more compute nodes when one or more predefined conditions are met. At step 510, the stream manager 134 identifies the conditions defined for lazy instantiation and lazy initialization for each of one or more subgraphs in the operator graph. The conditions may be based on any attribute of the stream computing application, and are generally based on the availability of data tuples waiting processing at the respective subgraphs. If the subgraph will not receive data tuples at a given time of day, the time of day and/or the presence of data tuples at the subgraph may comprise the condition. If the subgraph receives data tuples only under exceptional conditions, these conditions may be monitored. The conditions may be communicated to one or more processing elements such that the processing elements may monitor different attributes to determine whether the conditions are satisfied. Additionally, an application developer may define the conditions, and specify where and when to use lazy initialization, lazy instantiation, and dynamic instantiation. Furthermore, in embodiments where historically analysis has identified subgraphs to apply the techniques, the arrival of one or more tuples may comprise the condition.

At step 520, processing elements on the edge of the subgraph, stub processing elements representing the subgraph, and/or instantiated but uninitialized processing elements may monitor for the existence of the defined conditions for lazy instantiation and/or lazy initialization. For example, these processing elements may monitor their input ports to detect data tuples, and determine whether a threshold number of tuples have arrived within a predefined amount of time. In another embodiment, the stream manager 134 monitors the operator graph for the existence of the conditions indicating the subgraph should be instantiated and/or initialized.

At step 530, the processing elements determine whether the condition is satisfied. For example, a triggering condition may specify that processing element X must receive 50 data tuples in 1 minute in order for its portion of the subgraph to be initialized. If the triggering condition is not satisfied, the method returns to step 520. If the triggering condition is satisfied, the method proceeds to step 540, where the one or more processing elements determining that the condition is satisfies transmit an indication to the stream manager 134 that the condition has been satisfied. At step 550, the stream manager 134 may instantiate and/or initialize subgraphs meeting the triggering condition. At step 560, the stream manager 134 determines whether more subgraphs are not instantiated or initialized. If more subgraphs remain, the stream manager 134 returns to step 520. Otherwise, the complete operator graph has been instantiated and initialized, and the streams computing application continues to process streaming data tuples. Additionally, if dynamic instantiation is implemented, the stream manager 134 may remove or add subgraphs as necessary during execution of the stream computing application.

Figure 6:
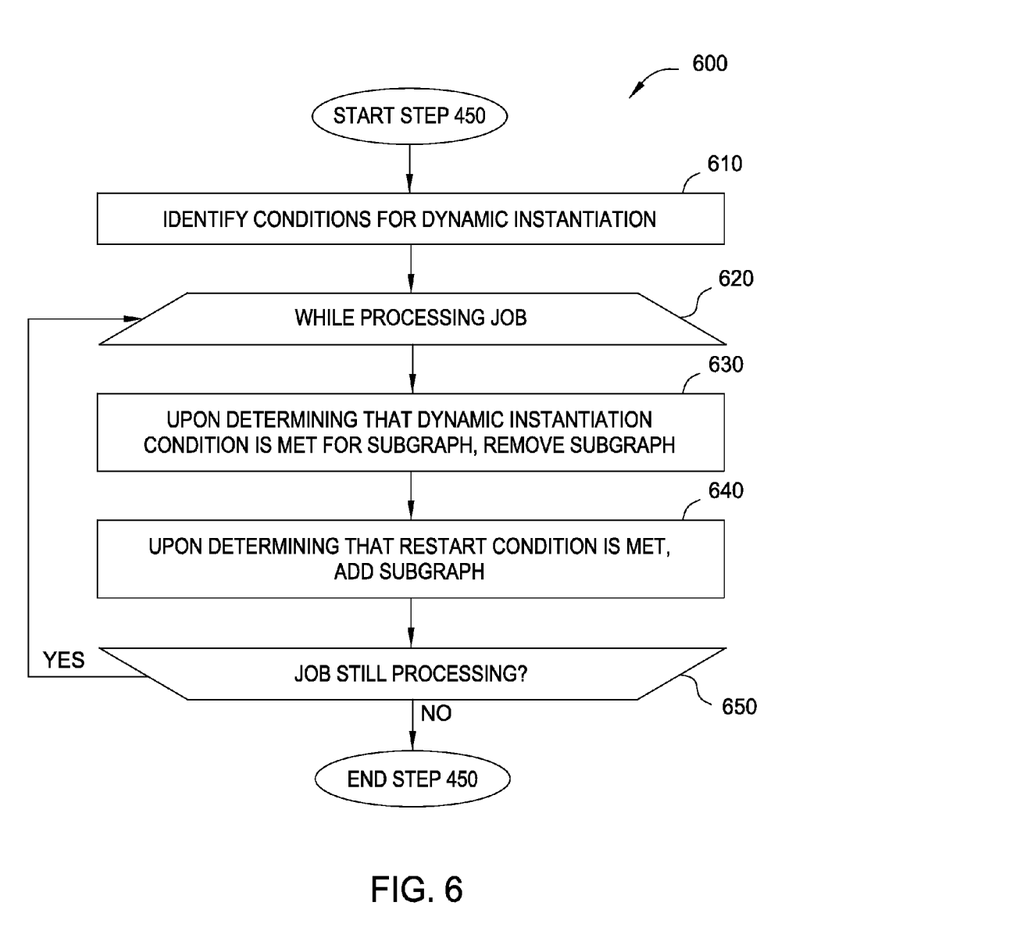
FIG. 6 illustrates a method to implement dynamic instantiation, according to one embodiment.

FIG. 6 illustrates a method 600 corresponding to step 450 to implement dynamic instantiation, according to one embodiment. Generally, the steps of the method 600 add or remove deployed (and possibly instantiated) subgraphs upon determining that one or more dynamic instantiation conditions are satisfied. At step 610, the stream manager 134 may identify one or more conditions for dynamic instantiation. The conditions may be communicated to one or more processing elements such that the processing elements may monitor different attributes to determine whether the conditions are satisfied. For example, a condition may specify that subgraph Y, including processing element Z, may be removed if it receives fewer than 10 data tuples in a 5 minute window, and subsequently re-added when it does receive more than 10 data tuples in a 5 minute window. Generally, any number of conditions may be defined for any number of processing elements, subgraphs, and physical or virtual compute nodes.

At step 620, the stream manager 134 executes a loop including steps 630-650 while the job is being processed. At step 630, the stream manager 134 removes a subgraph upon determining that a dynamic instantiation condition for the subgraph is met. Continuing with the above example, the stream manager 134 may receive an indication from processing element Z that it has received 8 data tuples in the previous 5 minute window. In response, the stream manager 134 may remove subgraph Y from the operator graph. The stream manager 134 may then replace the subgraph Y with a stub operator configured to receive data tuples for subgraph Y, or may configure another operator on the edge of subgraph Y to receive data tuples for subgraph Y. These operators may then continue to monitor data tuple flow, and determine whether the conditions for restarting subgraph Y are met. At 640, the stream manager 134 adds a removed subgraph upon determining that a restart condition is met. For example, if the stub or edge operator receives 100 data tuples intended for subgraph Y in 1 minute, the stream manager 134 may add subgraph Y back to the stream computing application such that it may process the received data tuples. At step 650, the stream manager 134 determines whether the job is still processing. If the job is still processing, the method returns to step 620, where dynamic instantiation continues. If the job is not processing, the method ends.

Advantageously, embodiments disclosed herein allow processing elements in a stream computing application to be instantiated and initialized on an as-needed basis, conserving resources that would have otherwise been wasted by instantiating and initializing all processing elements at the time of job deployment. By identifying a subgraph of processing elements that may not receive data tuples during certain times, or only under certain conditions, these processing elements may not be instantiated and/or initialized at deployment, and the resources may be reallocated to other processing elements. Additionally, instantiated and/or deployed processing elements may be monitored as part of a dynamic instantiation, where the processing elements are removed from the operator graph when they do not receive a threshold number of data tuples for a given period of time. The removed processing elements may later be re-added to the graph when the threshold number of data tuples arrives. Data flows throughout the graph may be monitored to determine whether conditions for lazy instantiation, lazy initialization, and dynamic instantiation are met. When the conditions are met, the subgraph may be instantiated and/or initialized.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications such as the stream manager 134, the flow manager 333, or related data available in the cloud. For example, the stream manager 134 could execute on a computing system in the cloud and implement lazy initialization, lazy instantiation, and dynamic instantiation in a stream computing application. In such a case, the stream manager 134 could define conditions for instantiation and initialization, and store the conditions at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving job information for a stream computing application, the job information defining at least a plurality of processing elements configured to process streaming data tuples by operation of one or more computer processors and according to an execution path defined by an operator graph;
    deploying a first set of processing elements of the plurality of processing elements to one or more compute nodes;
    initializing a subset of the first set of processing elements;
    executing the stream computing application on the first set of processing elements; and
    responsive to receiving a predefined number of data tuples to be processed by an additional processing element of the plurality of processing elements, wherein the predefined number of data tuples are not being processed by the first set of processing elements, wherein the additional processing element is not of the first set of processing elements:
        deploying the additional processing element to the one or more compute nodes; and
        initializing the additional processing element.

2. The method of claim 1, wherein the initialized subset of the first set of processing elements does not include a second processing element of the first set of processing elements, wherein the second processing element is not initialized, the method further comprising:
    upon determining that a predefined number of data tuples have been received to be processed by the second processing element, initializing the second processing element.

3. The method of claim 1, further comprising:
    upon determining that data tuples for an instantiated processing element have not been received for a predefined time threshold, uninstantiating the instantiated processing element.

4. The method of claim 3, further comprising:
    responsive to receiving a predefined number of data tuples to be processed by the uninstantiated processing element, instantiating and initializing the uninstantiated processing element.

5. The method of claim 1, wherein the predefined number of data tuples is received by a processing element adjacent to the additional processing element.

6. The method of claim 5, wherein the processing element adjacent to the additional processing element transmits an indication that the predefined number of data tuples have been received to a streams manager application configured to deploy and initialize the additional processing element.

7. The method of claim 5, wherein the processing element adjacent to the additional processing element comprises a stub processing element configured as a placeholder for the additional processing element.

8. A method, comprising:
    receiving job information for a stream computing application, the job information defining at least a plurality of processing elements configured to process streaming data tuples by operation of one or more computer processors and according to an execution path defined by an operator graph;
    deploying a first set of processing elements of the plurality of processing elements to one or more compute nodes;
    initializing a subset of the first set of processing elements;
    executing the stream computing application on the first set of processing elements;
    responsive to receiving a predefined number of data tuples to be processed by an additional processing element of the plurality of processing elements:
        deploying the additional processing element to the one or more compute nodes; and
        initializing the additional processing element; and
    upon determining that data tuples for an instantiated processing element have not been received for a predefined time threshold, uninstantiating the instantiated processing element.

9. The method of claim 8, further comprising:
    responsive to receiving a predefined number of data tuples to be processed by the uninstantiated processing element, instantiating and initializing the uninstantiated processing element.

* * * * *